United States Patent
Worrall et al.

(10) Patent No.: US 10,779,344 B2
(45) Date of Patent: Sep. 15, 2020

(54) TELECOMMUNICATIONS METHOD, TELECOMMUNICATIONS SYSTEM, PRIMARY NODE, SECONDARY NODE AND USER EQUIPMENT

(71) Applicant: Alcatel Lucent, Boulogne Billancourt (FR)

(72) Inventors: Chandrika K. Worrall, Swindon (GB); Sudeep K. Palat, Swindon (GB)

(73) Assignee: Nokia Technologies Oy, Espoo (FI)

( * ) Notice: Subject to any disclaimer, the term of this patent is extended or adjusted under 35 U.S.C. 154(b) by 228 days.

(21) Appl. No.: 14/892,270

(22) PCT Filed: Mar. 27, 2014

(86) PCT No.: PCT/EP2014/000850
§ 371 (c)(1),
(2) Date: Nov. 19, 2015

(87) PCT Pub. No.: WO2014/187515
PCT Pub. Date: Nov. 27, 2014

(65) Prior Publication Data
US 2016/0113052 A1   Apr. 21, 2016

(30) Foreign Application Priority Data

May 21, 2013  (EP) .................................... 13360009

(51) Int. Cl.
*H04W 36/00* (2009.01)
*H04W 76/15* (2018.01)
(Continued)

(52) U.S. Cl.
CPC ............ *H04W 76/15* (2018.02); *H04B 7/155* (2013.01); *H04L 63/18* (2013.01); *H04W 16/32* (2013.01);
(Continued)

(58) Field of Classification Search
CPC ............... H04W 76/025; H04W 16/32; H04W 72/0413; H04W 72/042; H04W 36/0069; H04B 7/155; H04L 63/18
See application file for complete search history.

(56) References Cited

U.S. PATENT DOCUMENTS 6,295,452 B1 * 9/2001 Choi ..................... H04W 36/12
370/331
7,957,349 B2   6/2011 Kim
(Continued)

FOREIGN PATENT DOCUMENTS

CN   101043714   9/2007
CN   101836481   3/2013
(Continued)

OTHER PUBLICATIONS

International Search Report for PCT/EP2014/000850 dated Sep. 2, 2014.
(Continued)

*Primary Examiner* — Charles N Appiah
*Assistant Examiner* — Xiang Zhang
(74) *Attorney, Agent, or Firm* — Fay Sharpe LLP

(57) ABSTRACT

A telecommunications method for a telecommunications system comprising a user equipment (202) in dual connection with a primary node (204) and a secondary node (206) is disclosed. The method comprises generating configuration information for the user equipment at a virtual radio resource control entity (210) of the secondary node or at the user equipment; transmitting the configuration information from the secondary node or the user equipment to a radio resource control entity (210) of the primary node; and transmitting the configuration information from the primary node to the other of the user equipment or secondary node from where the configuration information is received.

13 Claims, 5 Drawing Sheets

(51) Int. Cl.
  *H04B 7/155* (2006.01)
  *H04L 29/06* (2006.01)
  *H04W 16/32* (2009.01)
  *H04W 72/04* (2009.01)
  *H04W 12/04* (2009.01)

(52) U.S. Cl.
  CPC ..... *H04W 72/042* (2013.01); *H04W 72/0413* (2013.01); *H04W 12/04* (2013.01); *H04W 36/0069* (2018.08)

(56) References Cited

U.S. PATENT DOCUMENTS

| | | | |
|---|---|---|---|
| 2007/0049278 A1 | 3/2007 | Lindoff et al. | |
| 2009/0046656 A1* | 2/2009 | Kitazoe | H04W 24/10 370/331 |
| 2009/0262681 A1* | 10/2009 | Park | H04W 74/0866 370/328 |
| 2010/0227611 A1* | 9/2010 | Schmidt | H04W 76/15 455/434 |
| 2010/0260097 A1* | 10/2010 | Ulupinar | H04B 7/2606 370/315 |
| 2011/0009119 A1 | 1/2011 | Breuer et al. | |
| 2011/0098054 A1* | 4/2011 | Gorokhov | H04B 7/024 455/452.1 |
| 2012/0202478 A1* | 8/2012 | Van Lieshout | H04W 36/0055 455/419 |
| 2013/0203435 A1* | 8/2013 | Smith | H04W 16/14 455/454 |
| 2013/0250910 A1* | 9/2013 | Liao | H04W 36/08 370/331 |
| 2014/0128092 A1 | 5/2014 | Xiong et al. | |
| 2014/0146696 A1* | 5/2014 | Lin | H04W 72/12 370/252 |
| 2014/0204771 A1* | 7/2014 | Gao | H04W 36/22 370/252 |
| 2016/0029245 A1* | 1/2016 | Hong | H04W 28/0278 370/329 |

FOREIGN PATENT DOCUMENTS

| | | |
|---|---|---|
| EP | 2 381 719 A1 | 10/2011 |
| WO | 2011085195 | 7/2011 |
| WO | 2011/100492 A | 8/2011 |
| WO | WO 2012/006122 A1 | 1/2012 |
| WO | 2013/010418 A | 1/2013 |
| WO | WO 2013/024333 A2 | 2/2013 |

OTHER PUBLICATIONS

Huawei, HiSilicon, Study of Solutions and Radio Protocol Architecture for Dual-Connectivity[online], 3GPP TSG-RAN WG2 #81bis R2-131164, Apr. 6, 2013, [retrieved on Nov. 29, 2016], Retrieved from the Internet: <URL: http://www.3gpp.org/ftp/tsg_ran/WG2_RL2/TSGR2_81bis/Docs/R2-131164.zip>.

Nokia Corporation, Nokia Siemens Networks, C-plane alternatives for dual-connectivity [online], 3GPP TSG-RAN WG2 #81bis R2-131108, Apr. 4, 2013, [retrieved on Nov. 29, 2016], Retrieved from the Internet: <URL: http://www.3gpp.org/ftp/tsg_ran/WG2_RL2/TSGR2_81bis/Docs/R2-131108.zip>.

Alcatel-Lucent, Discussion on the RRC protocol supporting dual connectivity [online], 3GPP TSG-RAN WG2 #R2-131962, May 10, 2013, [retrieved on Nov. 29, 2016], Retrieved from the Internet: <URL: http://www.3gpp.org/ftp/tsg_ran/WG2_RL2/TSGR2_82/Docs/R2-131962.zip>.

NTT Docomo, Inc., Necessity of C-plane architecture enhancements for dual connectivity [online], 3GPP TSG-RAN WG2 #81 R2-130488, Jan. 18, 2013, [retrieved on Nov. 29, 2016], Retrieved from the Internet: <URL: http://www.3gpp.org/ftp/tsg_ran/WG2_RL2/TSGR2_81/Docs/R2-130488.zip>.

ITRI, Discussion on the scope of dual connectivity [online], 3GPP TSG-RAN WG2 #81 R2-130300, Jan. 19, 2013, [retrieved on Nov. 29, 2016], Retrieved from the Internet: <URL:.

Nokia Corporation, Nokia Siemens Networks, RRC Container definition and Work split between RAN2 and RAN3 [online], 3GPP TSG-RAN WG2 Meeting #63bis R2-085223, Sep. 23, 2008, [retrieved on Nov. 29, 2016], Retrieve from the Internet: <URL: http://www.3gpp.org/ftp/tsg_ran/WG2_RL2/TSGR2_63bis/Docs/R2-085223.zip>.

Alcatel-Lucent, Alcatel-Lucent Shanghai Bell, Discussion on the control plane protocol supporting dual connectivity [online], 3GPP TSG-RAN WG2 Meeting #83 R2-132769, Aug. 10, 2013, [retrieved on Nov. 29, 2016], Retrieved from the Internet: <URL: http://www.3gpp.org/ftp/tsg_ran/WG2_RL2/TSGR2_83/Docs/R2-132769.zip>.

English Bibliography of Chinese Application No. CN101043714A, Published Sep. 26, 2007, Printed from Derwent Innovation on Dec. 20, 2019, 5 pages.

English Bibliography of Chinese Application No. CN101836481A, Published Sep. 15, 2010, Printed from Derwent Innovation on Dec. 20, 2019, 5 pages.

English Bibliography of PCT Application No. WO2013010418A1, Published Jan. 24, 2013, Printed from Derwent Innovation on Dec. 20, 2019, 5 pages.

European Patent Application No. 13360009.8, Extended European Search Report, dated Oct. 23, 2013, 4 pages.

PCT Patent Application No. PCT/EP2014/000850, Written Opinion of the International Searching Authority, dated Sep. 2, 2014, 5 pages.

* cited by examiner

TELECOMMUNICATIONS METHOD, TELECOMMUNICATIONS SYSTEM, PRIMARY NODE, SECONDARY NODE AND USER EQUIPMENT

FILED OF THE INVENTION

The present invention relates to a telecommunications method for a telecommunications system comprising a user equipment in dual connection with a primary node and a secondary node, a telecommunications system, a primary node, a secondary node and to a user equipment.

BACKGROUND OF THE INVENTION

Small Cells are low power, low-cost base stations that are able to provide cellular service in residential or enterprise environments, with a typical coverage range of tens of metres. They have auto-configuration and self-optimization capabilities that enable a simple plug and play deployment, and are designed to automatically integrate themselves into an existing macrocellular network. Small cells, often referred to as pico cell, or metro cell, typically use the customer's broadband internet connection, for example DSL, cable or the like, as backhaul towards the macrocellular network. Support of non-ideal backhaul (with one way latency of few milliseconds to few tens of milliseconds) between small cells and between small cell and macro cells is considered as the typical deployment scenario.

Small cell deployment for handling the capacity needs in high traffic areas, such as hot spot areas, is an area of current investigation. One proposal for handling the capacity needs in high traffic areas is to provide dual connectivity support for user equipment. Dual connectivity support allows a User Equipment (UE) to be connected concurrently connected to a macro cell and a small cell, or indeed to two small cells. In other words, the UE can be connected to more than one cell at a time and the UE can be served by more than one cell at a time. Dual connectivity support is considered as a way to enable offloading of traffic when required.

However, dual connectivity support raises a number of issues relating to Radio Resource Control (RRC) plane architecture.

It is desirable to provide a RRC architecture which simplifies UE implementation/operation as well as avoiding the need for inter-protocol communication over an open interface.

SUMMARY OF THE INVENTION

According to a first aspect of the invention, there is provided a telecommunications method for a telecommunications system comprising a user equipment in dual connection with a primary node and a secondary node, the method comprising: generating configuration information for the user equipment at a virtual radio resource control (RRC) entity of the secondary node or at the user equipment; transmitting the configuration information from the secondary node or the user equipment to a radio resource control entity of the primary node; and transmitting the configuration information from the primary node to the other of the user equipment or secondary node from where the configuration information is received.

The proposed radio resource control plane architecture simplifies the UE implementation/operation as well as avoiding the need for inter-protocol communication specification, which is seen cumbersome when considering inter-vendor operation where the inter-protocol layer communication is usually left to the vendor specific macro cell eNB implementation.

The method may further comprise generating configuration information at a radio resource control entity of the user equipment.

The radio resource control entity of the primary node may include configuration information from the secondary node in a downlink radio resource control message sent to the user equipment.

The downlink radio resource control message may be transmitted from the primary node to the user equipment using a radio resource control connection between the radio resource control entity of the primary node and the user equipment.

The user equipment may decode the radio resource control message as it is received from the primary node, using security and transmission channel parameters of the primary node.

The radio resource control entity of the primary node may include configuration information from the user equipment in an uplink radio resource control message sent to the secondary node.

The method may further comprise transmitting the configuration information from the primary node to the user equipment via the secondary node, using layer 2 and/or layer 1 protocols or transmitting the configuration information to the secondary node via the user equipment, using layer 2 and/or layer 1 protocols.

The configuration information may be transmitted from the secondary node or user equipment to the primary node in a transparent container, wherein the transparent container may be forwarded to the other of the user equipment and secondary node, without the primary node decoding the configuration information in the transparent container.

The method may further comprise the primary node performing ciphering and/or integrity checks on the configuration information based on security keys. The ciphering and/or integrity checks may be performed by the packet data convergence protocol (PDCP) entity of the primary node.

The configuration information may be transmitted from the secondary node to the radio resource control entity of the primary node using modified X2 communications protocols.

An identification may be transmitted with the configuration informing, identifying the origin of the configuration information.

The primary node may be a macro cell node and the secondary node is a small cell node.

According to a second aspect of the invention, there is provided a telecommunications system, comprising: a primary node comprising a radio resource control (RRC) entity; a secondary node comprising a virtual radio resource control entity; and a user equipment in dual connection with the primary node and the secondary node, wherein the virtual radio resource control entity is operable to generate configuration information for the user equipment and transmit the configuration information to the radio resource control entity of the primary node, the user equipment is operable to generate configuration information and transmit the configuration information to the radio resource control entity of the primary node; and the radio resource control entity of the primary node is operable to transmit received configuration information to the other of the user equipment or secondary node from where the configuration information is received.

According to a third aspect of the invention, there is provided a primary node of a telecommunications system comprising a user equipment in dual connection with the primary node and a secondary node, the primary node comprising: a radio resource control (RRC) entity operable to receive configuration information for the user equipment from a virtual radio resource control entity of the secondary node or from the user equipment, and operable to transmit the received configuration information to the other of the user equipment or secondary node from where the configuration information is received.

According to a fourth aspect of the invention, there is provided a secondary node of a telecommunications system comprising a user equipment in dual connection with the secondary node and a primary node, the secondary node comprising: a virtual radio resource control (RRC) entity operable to generate configuration information for the user equipment and transmit the configuration information to a radio resource control entity of the primary node for subsequent transmission to the user equipment, and operable to receive configuration information from the user equipment via the radio resource control entity of the primary node.

According to a fifth aspect of the invention, there is provided a user equipment of a telecommunications system comprising a primary node and a secondary node, wherein the user equipment is in dual communication with the primary node and the secondary node, and the user equipment is operable to receive a configuration information for the user equipment from the secondary node via a radio resource control (RRC) entity of the primary node, and is operable to generate configuration information and transmit the configuration information to the radio resource control entity of the primary node for subsequent transmission to the secondary node.

According to a sixth aspect of the invention, there is provided a computer program product operable when executed on a computer to perform the method of the above first aspect.

Further particular and preferred aspects of the invention are set out in the accompanying independent and dependent claims.

BRIEF DESCRIPTION OF THE DRAWINGS

Some embodiments of the apparatus and/or methods in accordance with embodiment of the present invention are now described, by way of example only, with reference to the accompanying drawings, in which.

DESCRIPTION OF EMBODIMENTS

Figure 1:
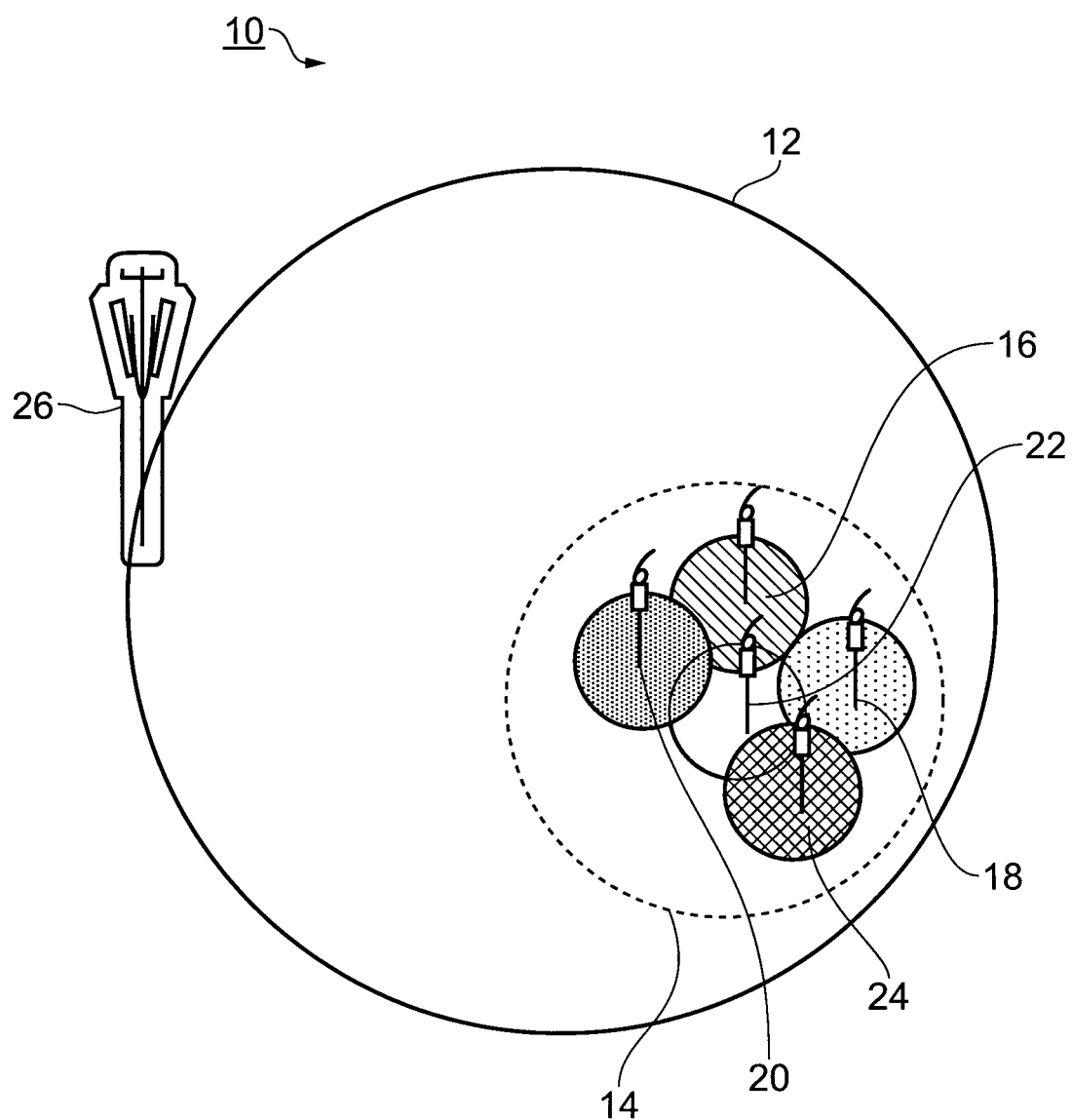
FIG. 1 shows an example of a telecommunications network comprising a small cell cluster and a macro cell.

FIG. 1 illustrates a heterogeneous telecommunications network 10 comprising a macro cell 12 and a cluster of small cells 14. The cluster of small cells 14 comprises a first small cell 16, a second small cell 18, a third small cell 20, a fourth small cell 22 and a fifth small cell 24. The small cells are distributed geographically to provide an area of coverage within the macro cell 12. User equipment (not shown) may roam through the network 10. When the user equipment is located within the macro cell 12, communications may be established between the user equipment and the macro cell base station 26 over an associated radio link. If the user equipment is located geographically within one of the small cells 16, 18, 20, 22 and 24, communications may be established between the user equipment and the base station of the associated small cell over an associated radio link. Of course, it will be appreciated that FIG. 1 shows only an example heterogeneous network and that a plurality of macro cells may be provided, more or less than five small cells may be provided and a plurality of small cell clusters may be provided.

As described above, within the macro cell 12, there is provided a plurality of small cell base stations which provide a plurality of small cells 16, 18, 20, 22, and 24. The small cells provide local communications coverage for a user in their vicinity. As a user equipment comes within range of a small cell, such as the first small cell 16, a handover may occur between the base station 26 of the macro cell and the base station 28 of the small cell, when the base station of the small cell detects that user equipment has come within range. Likewise, as a user equipment comes within range of a different small cell, a handover may occur between the base station of the current small cell and the base station of the new small cell, when the base station of the new small cell detects that user equipment has come within range.

In order to handle the capacity needs of a high traffic area, a user equipment in the telecommunications network 10 of FIG. 1 may be provided with dual connectivity support. That is, a user equipment may be connected to both the macro cell 12 and the small cell 16. Also, it should be appreciated that a user equipment may be dual connected to small cell 16 and any of the other small cells 18 to 24.

Figure 2:
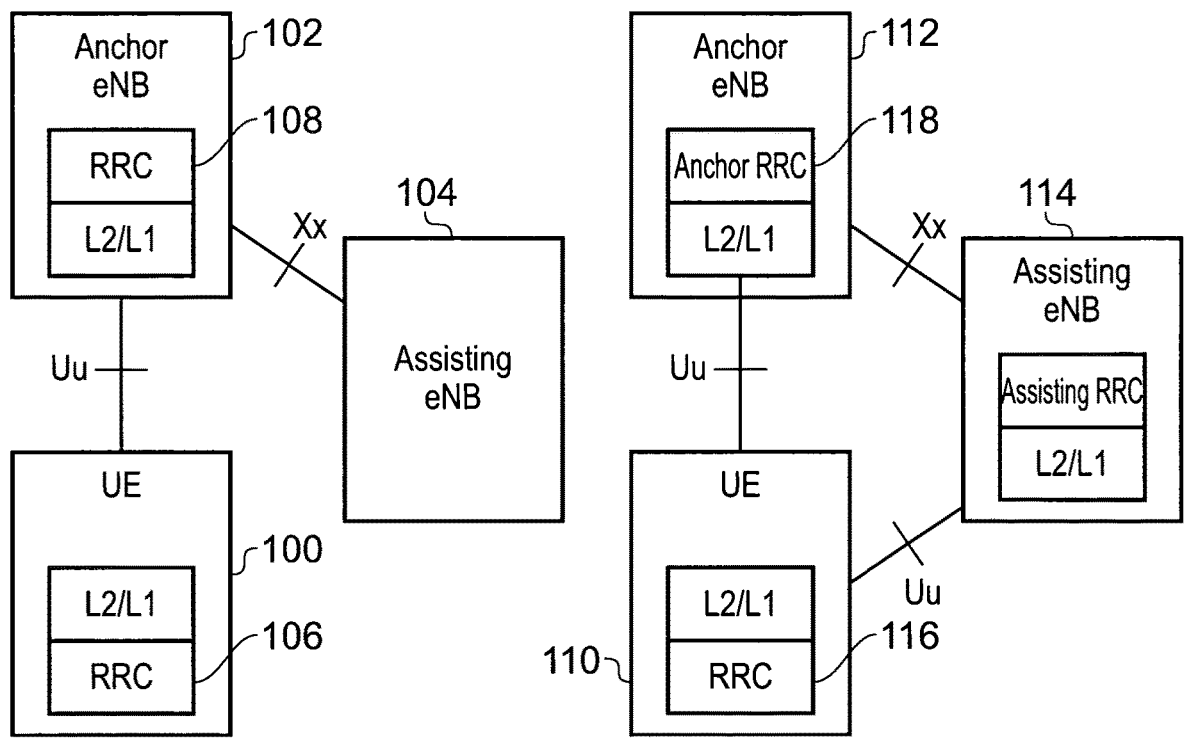
FIG. 2 shows proposed control plane architectures.
Figure 2:
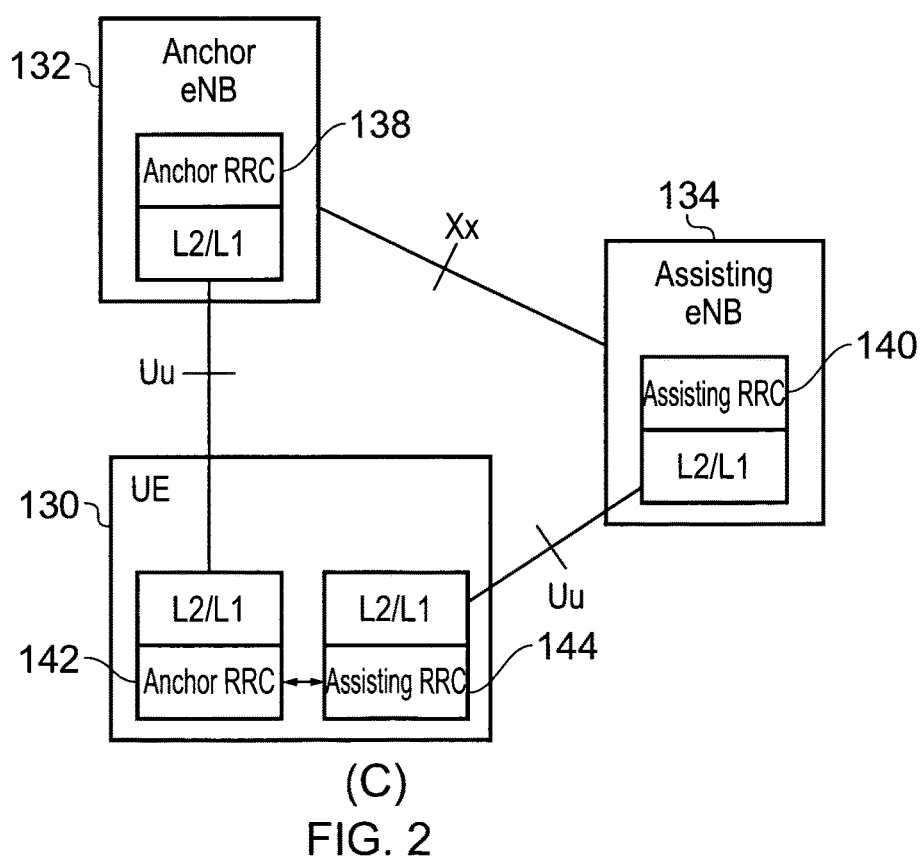

FIG. 2 shows proposed control plane architectures in which a user equipment (UE) is dual connected to a macro cell and a small cell.

In FIG. 2A, a UE 100 is dual connected to a macro cell 102 and a small cell 104. The macro cell 102 is sometimes referred to as the anchor eNB and the small cell is sometimes referred to the assisting eNB. An RRC entity 106 is maintained in the UE 100 and an RRC entity 108 is maintained in the macro cell eNB 102. RRC signaling is transmitted and received via radio resources provided by the macro cell 102. In the control plane architecture of FIG. 2A, the small cell 104 does not contain a RRC entity. It is therefore necessary for the small cell 104 to communicate control plane/configuration information to the macro cell 102 using Layer 2/Layer 1 protocols, which must then in turn communicate this configuration information to the UE 100 using RRC communication protocols.

The proposed architecture of FIG. 2A has the disadvantage that it requires a new set of specifications for the inter-protocol layer communication between the RRC entity 108 located at the macro eNB 102 and the Layer 2 protocols located at the small cell 104. Such inter-protocol specifications are not provided for in the current specification of LTE, as defined in 3GPP specification, TS 36.331 v11.3.0.

In FIG. 2B, a UE 110 is dual connected to a macro cell 112 and a small cell 114. An RRC entity 116 is maintained in the UE 110, an RRC entity 118, sometimes referred to as an anchor RRC entity, is maintained in the macro cell eNB 112, and an RRC entity 120, sometimes referred to as an assisting RRC entity, is maintained in the small cell eNB 114. In the control plane architecture of FIG. 2B, each node/cell involved in dual connectivity maintains an RRC entity which partly interacts with the RRC entity 116 in the UE 110.

In FIG. 2B, RRC signaling can be transmitted/received via radio recourses of the cell in which the corresponding function is maintained. For example, it could be that physical radio resource configuration related parameters for the small cell 114 are controlled by and signaled from the small cell 114, whereas other parameters are controlled by and signaled from the macro cell 112.

In FIG. 2C, a UE 130 is dual connected to a macro cell 132 and a small cell 134. An RRC entity 138, is maintained in the macro cell eNB 112 and an RRC entity 140 is maintained in the small cell eNB 114. The UE 130 maintains a first RRC entity 142 corresponding to the macro cell 132 and a second RRC entity 144 corresponding to the small cell 134.

In the control plane architecture of FIG. 2C, an RRC entity per each node/cell involved in dual connectivity is maintained in the UE 130 and in the network. The RRC entities can be dependent or independent of each other. The mechanism for RRC transmission/reception signalling via radio recourses of the cell are similar those described in relation to FIG. 2B.

In the control plane architectures of FIGS. 2B and 2C, the RRC entities located at the macro and small cell jointly provide the necessary lower parameter configuration for the lower protocol layer operations. The RRC entity at the small cell controls the functions and lower protocol parameters controlled by the small cell, while the RRC entity at the macro cell controls the global UE functions. Therefore, the RRC entity located at small cell is seen as secondary RRC entity while the RRC located at macro cell is seen as the primary RRC entity. From the functionality point of view operation of the control plane architectures of FIGS. 2B and 2C is similar, the only difference being the RRC protocol modelling at the UE. RRC is modelled as a single RRC entity in FIG. 2B while in FIG. 2C, the RRC is modelled as two RRC entities.

The control plane architectures of FIGS. 2B and 2C have the disadvantage that they require complex security architecture given that the RRC signal from the macro eNB and small cell eNB is required to be protected with sets of keys which are generated independently. This also increases the complexity at the UE.

As described above, the proposed control plane architectures of FIGS. 2A, 2B and 2C have a number of significant drawbacks. It is desirable to provide an RRC architecture which eliminates the problems seen in control plane architectures of FIGS. 2A, 2B and 2C for RRC protocol layer support for dual connectivity.

Figure 3:
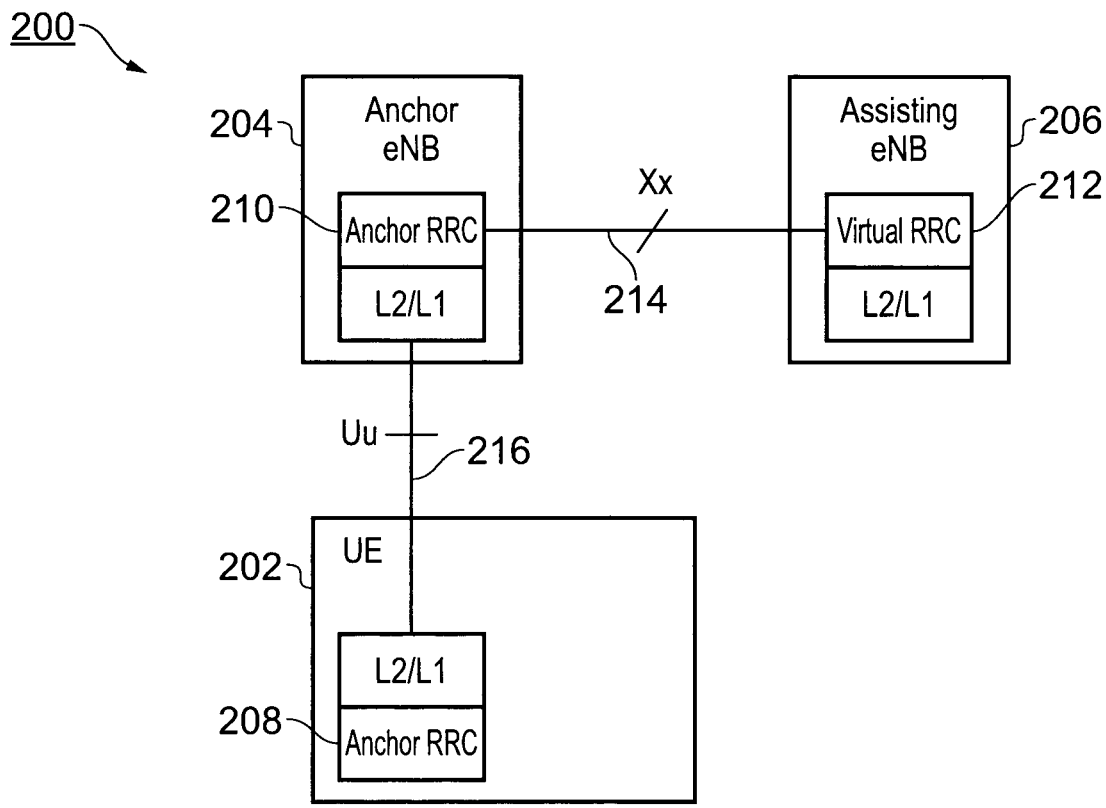
FIG. 3 shows the control plane architecture according to a first embodiment.

FIG. 3 shows a control plane architecture 200 according to a first embodiment. In FIG. 3, a UE 202 is provided with two serving cells. UE 202 is dual connected to a macro cell 204 (anchor eNB) and a small cell 206 (assisting eNB). It will be appreciated that although FIG. 3 shows the UE in connection with a macro cell and a small cell, the UE may be in dual connection to a first and second small cell.

Both the macro cell 204 and the small cell 206 will have RRC protocol functions/configuration information for the UE 202 during dual connectivity. However, the UE 202 only has one RRC protocol entity/layer communicating with one of the serving cells, in the embodiment shown in FIG. 3, this is the macro cell 204. In FIG. 3, the UE 202 has an RRC connection with the macro cell 204. This RRC connection is established between an RRC entity 208 maintained in the UE 202 and an RRC entity 210 maintained in the macro cell 204.

In other words, the small cell 206 must communicate its configuration information to the UE 202 via the macro cell 204. In view of this, the macro cell 204 may be considered to be a primary cell/node of the telecommunications network and the small cell 206 may be considered to be a secondary cell/node of the telecommunications network.

As the small cell 206 does not communicate RRC configuration information directly to the UE 202, the RRC entity 212 in the small cell 206 may be considered to be a virtual RRC entity to the UE 202.

The RRC entity 210 in the macro cell and the virtual RRC entity 212 in the small cell may communicate over an Xx interface 214 between small and macro cells. This interface 214 may be a modified version of the X2 interface, or may be a new interface not currently defined in the LTE specification or other backhaul link.

In the case that the small cell 206 has configuration information to send to the UE 202, the small cell 206 may generate configuration information for the UE 202 and forward this configuration information to the macro cell RRC entity 210. The configuration information may be RRC configuration information and may comprise layer 3, layer 2, layer 1 configurations for the small cell. In other words, the virtual RRC protocol layer (entity) located at the small cell (assisting) eNB may generate RRC configuration information relevant to the small cell including the small cell lower protocol parameter configuration, and may transmit this configuration information to the RRC entity 210 of the macro cell 204.

The configuration information may be transmitted to the RRC entity 210 of the macro cell 204 in a transparent container. That is, the macro cell RRC entity 212 will not control the message in the transparent container and will not decode the configuration information delivered in the transparent container. The RRC entity 212 will simply forward the configuration information to the UE.

The RRC entity 212 of the macro cell may encapsulate the configuration information for transmission to the UE in an RRC configuration message. The RRC entity 212 transmits the configuration information delivered from virtual RRC entity 212 of the small cell to the UE 202 over the Uu interface 216. The Uu interface 216 may be an S1 communications interface or any other suitable radio interface.

Ciphering and integrity protection for the configuration may be performed at the macro cell 204 based on macro cell eNB security keys. The ciphering and integrity protection on the configuration information may be performed by the packet data convergence protocol (PDCP) located at the anchor eNB (layer L2 ).

The UE 202 decodes the configuration information/RRC configuration message as it is received from the macro cell RRC entity 212, using security and transmission channel parameters of the macro cell eNB for the message decoding.

In the above architecture RRC protocol located at the small cell may be seen as virtual RRC layer to the UE. However, the lower layers (eg: layer 2/ Layer 1) of small cell is controlled directly by the virtual RRC located at the small cell. Therefore, In the embodiment of FIG. 3, the need for additional specification to be provided for inter-protocol communication is eliminated as both the controller, the virtual RRC entity in the embodiment of FIG. 3, and the layer 2 protocols are located at the same cell, the small cell in the embodiment of FIG. 3.

Figure 4:
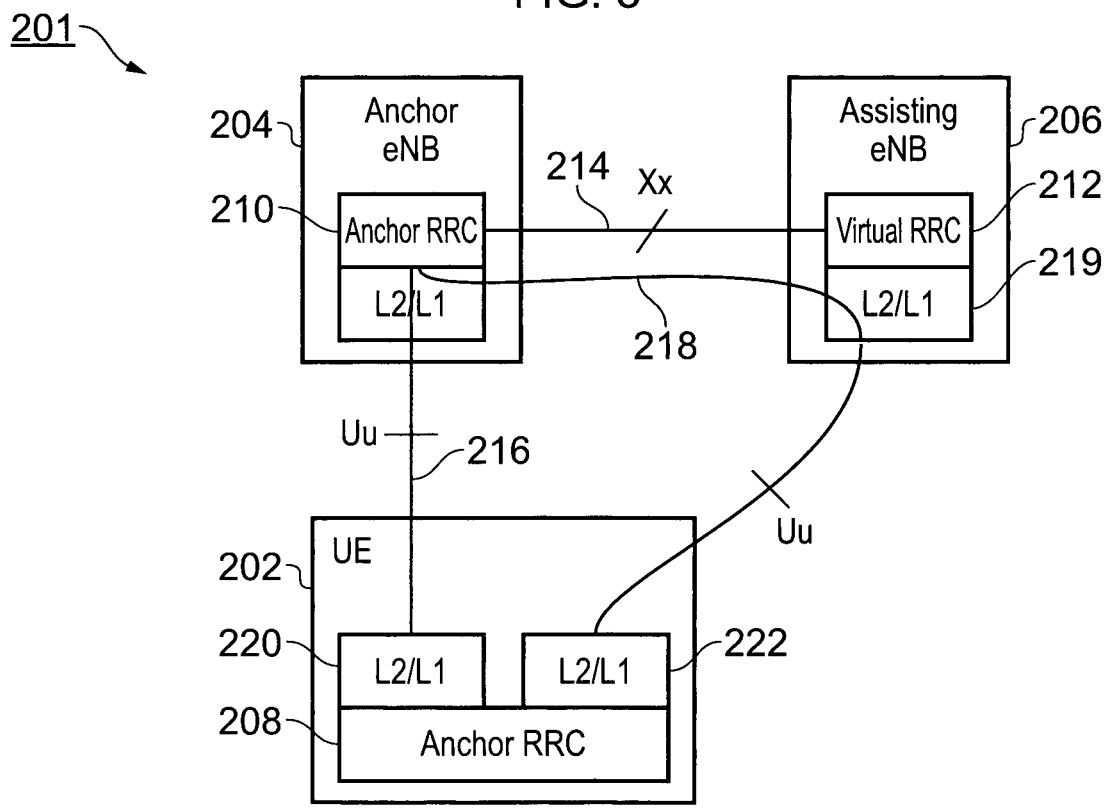
FIG. 4 shows the control place architecture according to a second embodiment.

FIG. 4 shows the control place architecture 201 according to a second embodiment. In the embodiment of FIG. 4, the control information generation is the same as that described above in relation to FIG. 3, and like features share the same reference numerals.

However, in FIG. 4 the transmission of the configuration information from the macro cell RRC entity 210 to the UE 202, may additionally take a transmission path 218 via the small cell eNB 206.

In other words, the virtual RRC entity 212 of the small cell may generate configuration information and this may be transmitted to the RRC entity 210 of the macro cell over Xx interface 214. The RRC entity may then transmit the configuration information to the UE 202 via the small cell over a transmission path 218. The transmission path 218 may be an S1 communications interface or any other suitable radio interface.

The small cell 206 receives the configuration information from the RRC entity 210 of the macro cell over transmission path 218, and extracts the layer 2/layers 1 protocol information from the configuration information at a layer 2/layer 1 entity 219 and transmits this layer 2/layer 1 protocol information to the UE 202.

The UE 202 comprises a first layer 2/layer 1 protocol entity 220 associated with the macro cell 204 and a second layer 2/layer 1 protocol entity associated with the small cell 206. The second layer 2/layer 1 protocol entity 222 receives the layer 2/layer 1 protocol information from the small cell 206 on transmission path 218, and decodes as necessary. Although FIG. 4 shows the UE 202 having first and second layer 2/layer 1 protocol entities, it should be appreciated that the function of these may be combined in a single layer 2/layer 1 protocol entity.

As layer 2/layer 1 protocol information is sent form the small cell 206 to the UE 202 on transmission path 218, rather than RRC configuration information, the need for additional specification to be provided for inter-protocol communication is eliminated.

By providing this additional transmission path for the configuration information from the macro cell RRC entity, transmission diversity for configuration information transmission may be provided, which may be beneficial should the configuration information experience different transmission qualities over different transmission paths.

It should also be appreciated that a cell identifier may be transmitted together with the configuration information in the embodiments of FIGS. 3 and 4, in order to identify the corresponding cell from which the configuration information relates.

Although FIGS. 3 and 4 are described with reference to downlink transmissions from the network to the UE, it will be appreciated that the embodiments are equally applicable to uplink transmission from the UE to the network. In other words, the UE may generate configuration and this may be transmitted to the small cell via the macro cell.

Figure 5:
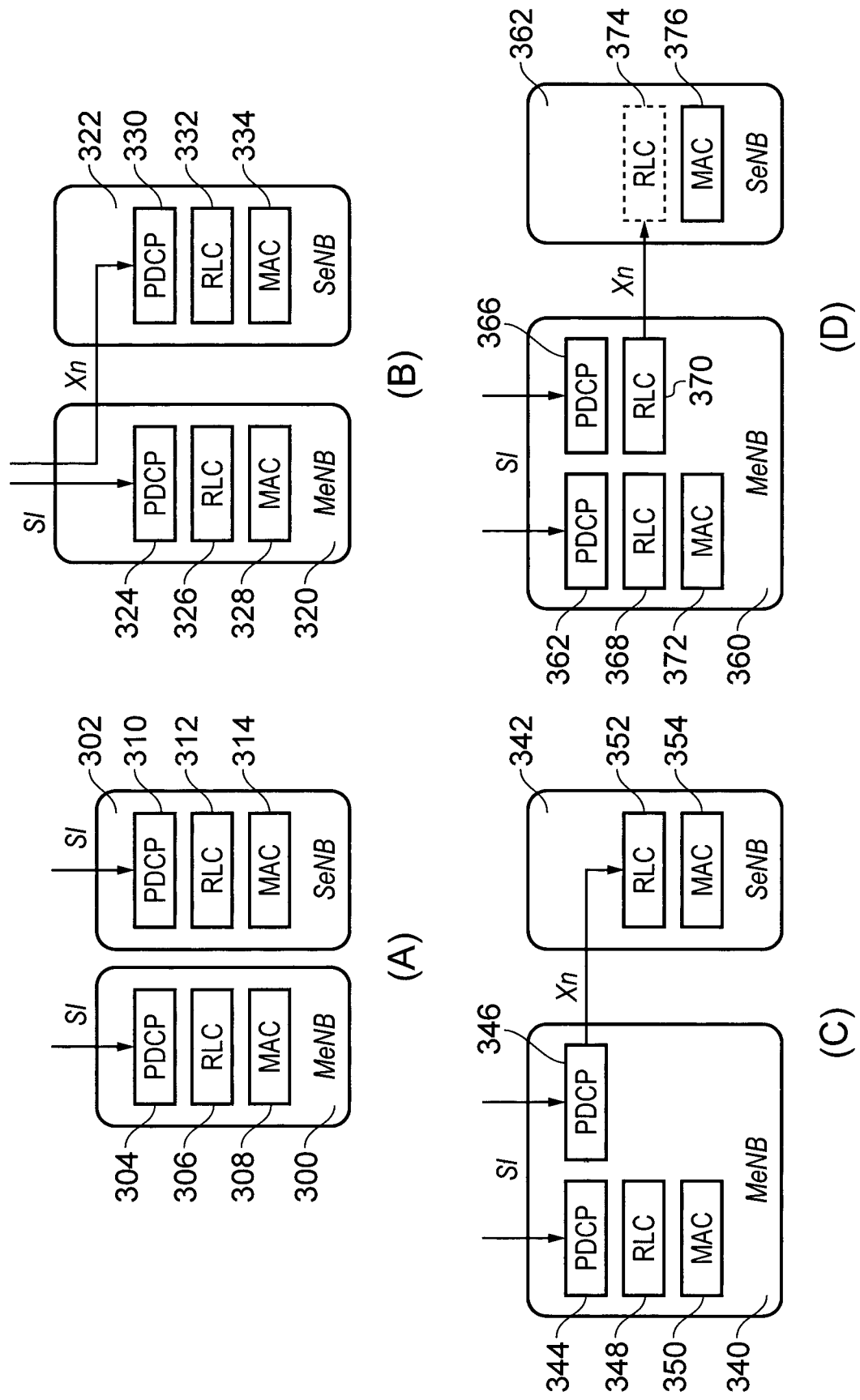
FIG. 5 shows alternative architecture configurations of layer 2/ layer 1.

FIG. 5 shows alternative architecture configurations for layer 2/layer 1 for the embodiments of FIG. 3 and FIG. 4. The layer 2/layer 1 protocol architecture of FIG. 3 and FIG. 4 may take any of the architecture option shown in FIGS. 5A, 5B, 5C and 5D.

FIG. 5A shows the layer 2/layer 1 architecture for a macro cell 300 and a small cell 302. The macro cell 300 comprises a Packet Data Convergence Protocol (PDCP) entity 304, a Radio Link Control (RLC) entity 306 and a Media Access Control (MAC) entity 308. The small cell 302 comprises a PDCP entity 310, a RLC entity 312 and a MAC entity 314. In the embodiment of FIG. 5A, both the PDCP entity 304 of the macro cell 300 and the PDCP entity 310 of the small cell 302 receive information from core network with regards to the EPS bearer through S1 communications interfaces.

FIG. 5B shows the layer 2/layer 1 architecture for a macro cell 320 and a small cell 322. Like FIG. 5A, the macro cell 320 comprises a PDCP entity 324, a RLC entity 326 and a MAC entity 328. The small cell 322 comprises a PDCP entity 330, a RLC entity 332 and a MAC entity 334. However, in the embodiment of FIG. 5B, the PDCP entity 324 of the macro cell 320 receives information through an S1 communications interface and the PDCP entity 330 of the small cell 322 receives information through an Xn interface, which may be a modified X2 interface, via the higher layer RRC protocol of the macro cell 320.

FIG. 5C shows the layer 2/layer 1 architecture for a macro cell 340 and a small cell 342. In FIG. 5C, the macro cell 340 comprises a first PDCP entity 344 and a second PDCP entity 346, a RLC entity 348 and a MAC entity 350. The small cell 342 comprises a RLC entity 352 and MAC entity 354. In the embodiment of FIG. 5C, the first and second PDCP entities 344, 346 of the macro cell 340 receive information through S1 communications interfaces. The RLC entity 352 of the small cell 342 receives information through an Xn interface, which may be a modified X2 interface, from the second PDCP entity 346 of the macro cell 340.

FIG. 5D shows the layer 2/ layer 1 architecture for a macro cell 360 and a small cell 362. In FIG. 5D, the macro cell 360 comprises a first PDCP entity 364 and second PDCP entity 366, a first RLC entity 368 and a second RLC entity 370 and a MAC entity 372. The small cell 362 comprises an RLC entity 374 and a MAC entity 376. The RLC entity 374 is shown with a dotted line, because this RLC at the small cell may not perform the whole of RLC protocol functions/procedures and so may be considered to act as a sub-set of RLC. In the embodiment of FIG. 5D, the first and second PDCP entities 364, 366 of the macro cell 360 receive information through S1 communications interfaces. The RLC entity 374 of the small cell 362 receives information through an Xn interface, which may be a modified X2 interface, from the second RLC entity 370 of the macro cell 360.

FIG. 5 shows how lower level protocol control can be achieved in the architectures of the embodiments of FIGS. 3 and 4.

Figure 6:
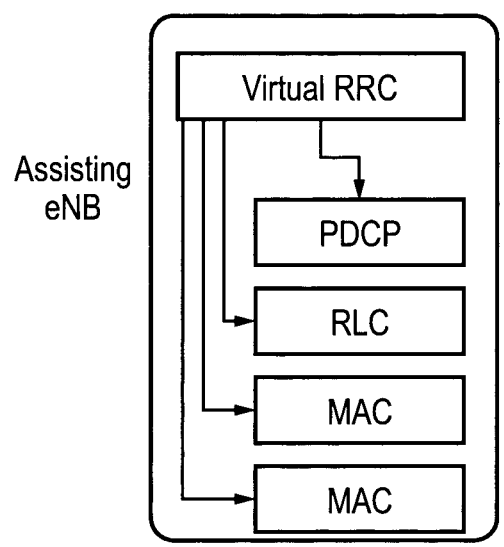
FIG. 6 shows the lower protocol layer control from the virtual RRC at the secondary/assisting cell.

FIG. 6 shows how the lower protocol layers of the small cell of FIGS. 3 and 4 are controlled by the virtual RRC entity of the small cell. The virtual RRC entity may directly control each of the PDCP entity, RLC entity and MAC entities of the small cell. Given the inter protocol layer communication here all occurs within the same node, it is not necessary to provide and additional control specifications for this inter-protocol layer communication. The inter-protocol layer communication is left to the specific implementation at the small cell eNB.

In order to distinguish RRC messages which are corresponding to the macro cell from that of small cell, the messages or information could also be tagged with cell specific identification. This may take the form of implicit or explicit indication. if the messages and parameters for small cell is different from that of macro cell, the cell specific identification is implicitly indicated by the message or parameter itself.

The present inventions may be embodied in other specific apparatus and/or methods. The described embodiments are to be considered in all respects as only illustrative and not restrictive. In particular, the scope of the invention is indicated by the appended claims rather than by the description and figures herein. All changes that come within the meaning and range of equivalency of the claims are to be embraced within their scope.

The invention claimed is:

1. A telecommunications method for a telecommunications system comprising a user equipment in dual connection with a primary node and a secondary node, the method comprising:
generating configuration information for the user equipment at a virtual radio resource control entity of the secondary node;
transmitting the configuration information from the secondary node to a radio resource control entity of the primary node; and
transmitting the configuration information from the primary node to the user equipment;
wherein, while the user equipment is establishing a dual connection with the primary node and the secondary node, the user equipment:
has a radio resource control (RRC) protocol layer in communication with the primary node; and
does not have a RRC protocol layer in communication with the secondary node for the configuration information; and
wherein the configuration information is transmitted from the secondary node to the primary node in a transparent container, and wherein the transparent container is forwarded to the user equipment without the primary node decoding the configuration information in the transparent container;
wherein the user equipment decodes a downlink radio resource control message as it is received from the primary node, using security and transmission channel parameters of the primary node.

2. The method according to claim 1, wherein the radio resource control entity of the primary node includes configuration information from the secondary node in the downlink radio resource control message sent to the user equipment.

3. The method according to claim 2, wherein the downlink radio resource control message is transmitted from the primary node to the user equipment using a radio resource control connection between the radio resource control entity of the primary node and the user equipment.

4. The method according to claim 1, wherein the radio resource control entity of the primary node includes configuration information from the user equipment in an uplink radio resource control message sent to the secondary node.

5. The method according to claim 1, further comprising transmitting the configuration information from the primary node to the user equipment via the secondary node, using layer 2 and/or layer 1 protocols.

6. The method according to claim 1, further comprising the primary node performing ciphering and/or integrity checks on the configuration information based on security keys.

7. The method according to claim 1, wherein the configuration information is transmitted from the secondary node to the radio resource control entity of the primary node using modified X2 communications protocols.

8. The method according to claim 1, wherein the primary node is a macro cell node and the secondary node is a small cell node.

9. A telecommunications system, comprising:
a primary node comprising a radio resource control entity;
a secondary node comprising a virtual radio resource control entity; and
a user equipment configured to establish a dual connection with the primary node and the secondary node;
wherein:
the virtual radio resource control entity is operable to generate configuration information for the user equipment and transmit the configuration information to the radio resource control entity of the primary node;
the user equipment is operable to generate configuration information and transmit the configuration information to the radio resource control entity of the primary node;
the radio resource control entity of the primary node is operable to transmit received configuration information to the other of the user equipment or secondary node from where the configuration information is received;
the user equipment:
has a radio resource control (RRC) protocol layer in communication with the primary node; and
does not have a RRC protocol layer in communication with the secondary node for the configuration information;
the secondary node is configured to transmit the configuration information to the primary node in a transparent container; and
the primary node is configured to forward the transparent container to the user equipment without decoding the configuration information in the transparent container;
wherein the user equipment is configured to decode a downlink radio resource control message as it is received from the primary node, using security and transmission channel parameters of the primary node.

10. A primary node of a telecommunications system comprising a user equipment in dual connection with the primary node and a secondary node, the primary node comprising:
a radio resource control entity operable to receive configuration information for the user equipment from a virtual radio resource control entity of the secondary node, and operable to transmit the received configuration information to the user equipment;
wherein, while the user equipment is establishing a dual connection with the primary node and the secondary node:
the primary node has a radio resource control (RRC) protocol layer in communication with the user equipment; and
the user equipment does not have a RRC protocol layer in communication with the secondary node for the configuration information; and
wherein the primary node is configured to: (i) receive the configuration information in a transparent container, and (ii) forward the transparent container to the user equipment without decoding the configuration information in the transparent container;
wherein the user equipment is configured to decode a downlink radio resource control message as it is received from the primary node, using security and transmission channel parameters of the primary node.

11. A secondary node of a telecommunications system comprising a user equipment in dual connection with the secondary node and a primary node, the secondary node comprising:
a virtual radio resource control entity operable to generate configuration information for the user equipment and transmit the configuration information to a radio resource control entity of the primary node for subsequent transmission to the user equipment;

wherein, while the user equipment is establishing a dual connection with the primary node and the secondary node, the secondary node does not have a radio resource control (RRC) protocol layer in communication with the user equipment for the configuration information; and wherein the secondary node is configured to transmit the configuration information to the primary node in a transparent container, and wherein the transparent container is configured to be forwarded to the user equipment without the primary node decoding the configuration information in the transparent container;

wherein the user equipment is configured to decode a downlink radio resource control message as it is received from the primary node, using security and transmission channel parameters of the primary node.

12. A user equipment of a telecommunications system comprising a primary node and a secondary node, wherein:

the user equipment is configured to establish a dual connection with the primary node and the secondary node, the user equipment is operable to receive configuration information for the user equipment from the secondary node via a radio resource control entity of the primary node;

while the user equipment is establishing the dual connection with the primary node and the secondary node, the user equipment does not have a radio resource control (RRC) protocol layer in communication with the secondary node for the configuration information; and the configuration information is configured to be transmitted from the secondary node to the primary node in a transparent container, and wherein the user equipment is configured to receive the transparent container without the primary node decoding the configuration information in the transparent container;

wherein the user equipment is configured to decode a downlink radio resource control message as it is received from the primary node, using security and transmission channel parameters of the primary node.

13. A computer program product stored on a non-transitory computer readable medium, and operable, when executed on a computer, to perform the method of claim 1.

* * * * *